US012250543B2

(12) United States Patent
Levionnais et al.

(10) Patent No.: US 12,250,543 B2
(45) Date of Patent: Mar. 11, 2025

(54) METHOD AND DEVICE FOR SUPPLYING A TERMINAL OF A FIRST USER WITH A BIOMETRIC SIGNATURE OF A SECOND USER

(71) Applicant: Orange, Issy-les-Moulineaux (FR)

(72) Inventors: Philippe Michel Levionnais, Chatillon (FR); Olivier Lepetit, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 221 days.

(21) Appl. No.: 17/914,526

(22) PCT Filed: Mar. 22, 2021

(86) PCT No.: PCT/FR2021/050482
§ 371 (c)(1),
(2) Date: Sep. 26, 2022

(87) PCT Pub. No.: WO2021/191546
PCT Pub. Date: Sep. 30, 2021

(65) Prior Publication Data
US 2023/0141504 A1    May 11, 2023

(30) Foreign Application Priority Data
Mar. 27, 2020   (FR) ...................................... 2003038

(51) Int. Cl.
*H04L 9/40*        (2022.01)
*H04W 12/065*    (2021.01)
(52) U.S. Cl.
CPC ....... *H04W 12/065* (2021.01); *H04L 63/0861* (2013.01)
(58) Field of Classification Search
CPC .......................... H04W 12/065; H04L 63/0861
(Continued)

(56) References Cited

U.S. PATENT DOCUMENTS

2011/0154485 A1   6/2011  Hyun et al.
2015/0149310 A1*  5/2015  He ........................... H04B 5/22
                                                                                705/44

(Continued)

FOREIGN PATENT DOCUMENTS

EP        3667955 A1      6/2020
KR     20190063392 A      6/2019
WO     2016001506 A1      1/2016

OTHER PUBLICATIONS

English translation of the Written Opinion of the International Searching Authority dated Jun. 7, 2021 for corresponding International Application No. PCT/FR2021/050482, filed Mar. 22, 2021.

(Continued)

*Primary Examiner* — Michael S McNally
(74) *Attorney, Agent, or Firm* — David D. Brush; Westman, Champlin & Koehler, P.A.

(57) ABSTRACT

A method for supplying and a method for obtaining, by a terminal, from a first user, a biometric signature of a second user. The terminal receives a radio signal transmitted by a transmitter device according to a near-field communication technology, via a channel using the electromagnetic wave conduction capabilities of the body of the second user when the second user comes into contact with or grazes a surface of the transmitter device and via a channel using the electromagnetic wave capabilities of the body of the first user when the first user comes into contact with or grazes the second user, and obtains, from this radio signal, the biometric signature of the second user. The biometric signature is stored in a secure memory space of the terminal in order to be used subsequently during an authentication of the first user.

15 Claims, 4 Drawing Sheets

(58) Field of Classification Search
USPC .......................................................... 726/7
See application file for complete search history.

(56) References Cited

U.S. PATENT DOCUMENTS

2015/0278498 A1   10/2015   Hong et al.
2020/0042685 A1   2/2020    Tussy et al.

OTHER PUBLICATIONS

International Search Report dated May 25, 2021 for corresponding International Application No. PCT/FR2021/050482, filed Mar. 22, 2021.
Written Opinion of the International Searching Authority dated May 25, 2021 for corresponding International Application No. PCT/FR2021/050482, filed Mar. 22, 2021.

* cited by examiner

METHOD AND DEVICE FOR SUPPLYING A TERMINAL OF A FIRST USER WITH A BIOMETRIC SIGNATURE OF A SECOND USER

CROSS-REFERENCE TO RELATED APPLICATIONS

This Application is a Section 371 National Stage Application of International Application No. PCT/FR2021/050482, filed Mar. 22, 2021, which is incorporated by reference in its entirety and published as WO 2021/191546 A1 on Sep. 30, 2021, not in English.

The invention lies in the field of biometric recognition implemented via communications initiated over a short-range wireless channel. More specifically, the invention relates to a method for temporarily delegating, to a first user, authentication data of a second user resulting from a signal transmitted using IBC (Intra-Body Communication) technology, via the human body of the two users.

There are nowadays biometric techniques that allow a user to authenticate himself to a device or a service, or to secure a transaction. Such biometric techniques use characteristics specific to the user to recognize this user, for example his fingerprints, his iris, his palm print, his voice, etc.

Over the past few decades, new wireless communication techniques have emerged, using the human body as a channel. In these technologies, which are grouped together under the generic term IBC (for Intra-Body Communication) or else BCC (for Body Channel Communication) or CBB (for Communication By Body), the human body acts as a conductor for transmitting information from one point to another.

Such technologies are used in particular in near-field communications (or NFC) between terminals. In IBC technology, when an NFC signal is transmitted by a transmitter device, and a user comes into contact with or touches a surface of the transmitter device, the transmitted NFC signal is modified by passing through the body of the user. Such a signal transmitted by the body of the user may thus be picked up by a terminal close to the user, for example a terminal held in the hand by the user or else placed in his pocket.

The NFC signal thus picked up by the terminal contains characteristics specific to the user via whose body the NFC signal was conducted. Such a signal therefore constitutes a biometric signature of the user. Such a biometric signature may then be used to authenticate the user, for example during wireless transactions with an NFC payment terminal, by comparing the signal picked up by the terminal of the user with a reference signal learnt beforehand for the user and for example stored on the terminal.

By contrast, until now, regardless of the biometric technique used to secure a transaction, it is not possible for a person having his rights to temporarily "lend" his biometric characteristics to a third party. It is thus impossible to temporarily lend his fingerprints, his iris, his palm print, his voice, etc. for a transaction.

Indeed, for an authentication using a biometric technique, the presence of the user is essential in order to validate the authentication of the user.

It is thus not possible for a user to temporarily "lend" his biometric signature to a third party.

There is therefore a need to improve the technique.

The invention aims to improve the prior art. To this end, it relates to a method for supplying a terminal of a first user with a biometric signature of a second user. Such a method is implemented by a transmitter device and comprises:

generating a radio signal using a near-field communication technology, transmitting said generated radio signal to the terminal of the first user, the radio signal being conducted via a channel using the abilities of the body of the second user to conduct electromagnetic waves when the second user comes into contact with or touches a surface of the transmitter device and via a channel using the abilities of the body of the first user to conduct electromagnetic waves when the first user comes into contact with or touches the second user, the signal conducted via the body of the first user and via the body of the second user comprising a signal representative of the biometric signature of the second user.

The invention thus proposes a method that allows a user (second user) to delegate his biometric rights defined using an IBC technology to another user (first user).

Indeed, according to the invention, the biometric rights of the second user correspond to a signal representing a voluntary gesture by the second user when the latter brushes or touches a surface of a transmitter device transmitting an NFC-type radio signal. Such a signal representing a voluntary gesture by the second user is characteristic of the second user. Indeed, for the signals transmitted via the human body, the form of the signal generated and transmitted via the body of the user depends in particular on a certain number of characteristics specific to the wearer (corpulence, age, sex, humidity of the tissues, internal morphology of the tissues (bones, tendons, muscles), etc.). The analysis of such a signal (shape, power, etc.) makes it possible to identify characteristics specific to the user.

According to the invention, the radio signal intended for the terminal of the first user is modified firstly during the transmission via the body of the second user and secondly during the transmission via the body of the first user. The terminal of the first user therefore receives a radio signal bearing the characteristics of the second user and the characteristics of the first user. The biometric signature of the second user may either be obtained from the analysis of the radio signal intended for the terminal of the first user or encoded in a frame of the radio signal.

The biometric signature of the second user may correspond to the signal representing the voluntary gesture of the second user or to a group of characteristic data obtained by analyzing the shape and power of this signal.

The invention thus allows secure transmission of the biometric signature of the second user to the terminal of the first user. Indeed, such a transmission requires the presence of the second user and a voluntary gesture on his part in order to activate the transmission.

According to one particular embodiment of the invention, the supply method further comprises initializing at least one validity criterion associated with the biometric signature of the second user, the validity criterion being encoded in a frame of the transmitted radio signal. Advantageously, the delegation is set up, or is done, in a controlled manner by the second user. For example, it may be implemented temporarily. Indeed, initializing a validity criterion makes it possible to control the first user's use of the biometric signature of the second user which has been delegated to him. The second user can thus set a criterion to be validated when his biometric signature is used by the first user. Such a criterion may correspond to a number of uses of the biometric signature, or to a maximum amount not to be exceeded during a payment transaction, or even to a combination of the two.

According to another variant, the validity criterion may be an identifier or a code to be verified when the biometric signature is used by the first user.

According to another particular embodiment of the invention, generating the radio signal comprises:

obtaining a group of characteristic data of the second user from a radio signal transmitted by the transmitter device and received by a terminal of the second user via a channel using the electromagnetic wave conduction capabilities of the body of the second user when the second user comes into contact with or touches a surface of the transmitter device, encoding the group of characteristic data of the second user in the radio signal to the terminal of the first user.

According to this particular embodiment of the invention, the characteristic data of the voluntary gesture of the second user are obtained by the transmitter device and encoded in the radio signal intended for the terminal of the first user. Thus, it is not necessary to analyze the shape and power of the signal received by the terminal of the first user in order to extract the signal representing the voluntary gesture of the second user or the characteristic data of this voluntary gesture from the radio signal received by the terminal of the first user.

Indeed, when the radio signal received by the terminal of the first user does not encode the characteristic data of the voluntary gesture of the second user, said data must be extracted by analyzing the shape and power of the radio signal received by the terminal of the first user.

The invention also relates to a method for obtaining a biometric signature of a second user by way of a terminal of a first user. Such an obtaining method is implemented by the terminal of the first user and comprises:

receiving a radio signal transmitted by a transmitter device using a near-field communication technology, via a channel using the electromagnetic wave conduction capabilities of the body of the second user when the second user comes into contact with or touches a surface of the transmitter device and via a channel using the electromagnetic wave conduction capabilities of the body of the first user when the first user comes into contact with or touches the second user, obtaining the biometric signature of the second user from the received radio signal, storing the obtained biometric signature of the second user in a secure memory space of the terminal of the first user.

According to one particular embodiment of the invention, the obtaining method further comprises decoding from the received radio signal, and storing, a validity criterion associated with the biometric signature of the second user.

According to another particular embodiment of the invention, obtaining the biometric signature of the second user comprises decoding a group of characteristic data of the second user. According to this particular embodiment of the invention, the characteristic data of the second user are directly encoded in a frame of the radio signal received by the terminal.

According to another particular embodiment of the invention, obtaining the biometric signature of the second user comprises extracting a characteristic signal of the second user from the received radio signal and from a characteristic signal of the first user previously stored by the terminal.

According to this particular embodiment of the invention, the biometric signature of the second user is not encoded in the radio signal. The radio signal received represents the convolution of the voluntary gesture of the second user and the deformation of this gesture by the transfer function of the first user. The biometric signature of the second user is then obtained by de-convoluting the received radio signal using a characteristic signal (or transfer function) of the first user that has been learnt beforehand.

According to another particular embodiment of the invention, obtaining the biometric signature of the second user comprises obtaining a group of characteristic data of the second user from the extracted characteristic signal of the second user. This particular embodiment of the invention makes it possible to use fewer resources to store the biometric signature of the second user because only the characteristic points of the signal representing the voluntary gesture of the second user are stored, and not the entire signal. In addition, the use of the biometric signature of the second user by the first user is simplified, because the subsequent authentication is carried out by comparing the characteristic data derived from the signals representing the voluntary gestures of the user.

The invention also relates to a method for authenticating a first user with a biometric signature of a second user, said method being implemented by an authentication device. Such an authentication method comprises:

receiving, from a terminal of the first user, data representing the biometric signature of the second user, obtaining characteristic data of the second user from the data representing the biometric signature of the second user, comparing the obtained characteristic data of the second user with reference characteristic data of the second user, when the obtained characteristic data of the second user correspond to the reference characteristic data of the second user, validating the authentication of the first user.

According to one particular embodiment of the invention, the authentication method further comprises:

obtaining from the received data at least one validity criterion associated with the biometric signature, confirming that the validity criterion is satisfied, validation of the authentication of the first user being implemented only when the validity criterion is satisfied.

According to another particular embodiment of the invention, the authentication method further comprises:

updating said at least one validity criterion, sending said at least one updated validity criterion to the terminal of the first user.

According to one particular embodiment of the invention, the validity criterion corresponds to at least one of the following criteria:

a maximum number of uses of the biometric signature, a maximum amount authorized during a payment transaction, a maximum cumulative amount authorized during successive payment transactions, an identifier, a code.

According to another particular embodiment of the invention, the validity criterion is satisfied when a value of the validity criterion is positive or when a value of the validity criterion corresponds to a predetermined value.

Correlatively, the invention also relates to a transmitter device configured to supply a terminal of a first user with a biometric signature of a second user, comprising a processor and a memory that are configured to:
- generate a radio signal using a near-field communication technology,
- transmit said generated radio signal to the terminal of the first user, via a channel using the electromagnetic wave conduction capabilities of the body of the second user when the second user comes into contact with or touches a surface of the transmitter device and via a channel using the electromagnetic wave conduction capabilities of the body of the first user when the first user comes into contact with or touches the second user.

The invention also relates to a terminal of a first user configured to obtain a biometric signature of a second user, comprising a processor and a memory that are configured to:
- receive a radio signal transmitted by a transmitter device using a near-field communication technology, via a channel using the electromagnetic wave conduction capabilities of the body of the second user when the second user comes into contact with or touches a surface of the transmitter device and via a channel using the electromagnetic wave conduction capabilities of the body of the first user when the first user comes into contact with or touches the second user,
- obtain the biometric signature of the second user from the received radio signal,
- store the obtained biometric signature of the second user in a secure memory space of the terminal of the first user.

The invention also relates to an authentication device for authenticating a first user with a biometric signature of a second user, comprising a processor and a memory that are configured to:
- receive, from a terminal of the first user, data representing the biometric signature of the second user, from a radio signal transmitted by a transmitter device using a near-field communication technology, via a channel using the electromagnetic wave conduction capabilities of the body of the second user when the second user comes into contact with or touches a surface of a transmitter device, and via a channel using the electromagnetic wave conduction capabilities of the body of the first user when the first user comes into contact with or touches the second user,
- obtain characteristic data of the second user from the data representing the biometric signature of the second user,
- compare the obtained characteristic data of the second user with reference characteristic data of the second user,
- when the obtained characteristic data of the second user correspond to the reference characteristic data of the second user, validate the authentication of the first user.

The invention also relates to a computer program comprising instructions for implementing the supply method or the obtaining method or the authentication method mentioned above according to any one of the particular embodiments described previously when said program is executed by a processor. These methods may be implemented in various ways, in particular in hard-wired form or in the form of software. These programs may use any programming language, and be in the form of source code, object code, or of intermediate code between source code and object code, such as in a partially compiled form, or in any other desirable form.

The invention is also aimed at a computer-readable storage medium or data medium containing instructions of a computer program as mentioned above. The abovementioned storage media may be any entity or device capable of storing the program. For example, the medium may comprise a storage means, such as a ROM, for example a CD-ROM or a microelectronic circuit ROM, or else a magnetic storage means, for example a hard disk. Moreover, the storage media may correspond to a transmissible medium such as an electrical or optical signal, which may be routed via an electrical or optical cable, by radio or by other means. The programs according to the invention may in particular be downloaded from the Internet.

As an alternative, the storage media may correspond to an integrated circuit in which the program is incorporated, the circuit being designed to execute or to be used in the execution of the method in question.

Other features and advantages of the invention will become more clearly apparent on reading the following description of particular embodiments, which are given by way of simple illustrative and non-limiting examples, and the appended drawings, in which.

Figure 1A:
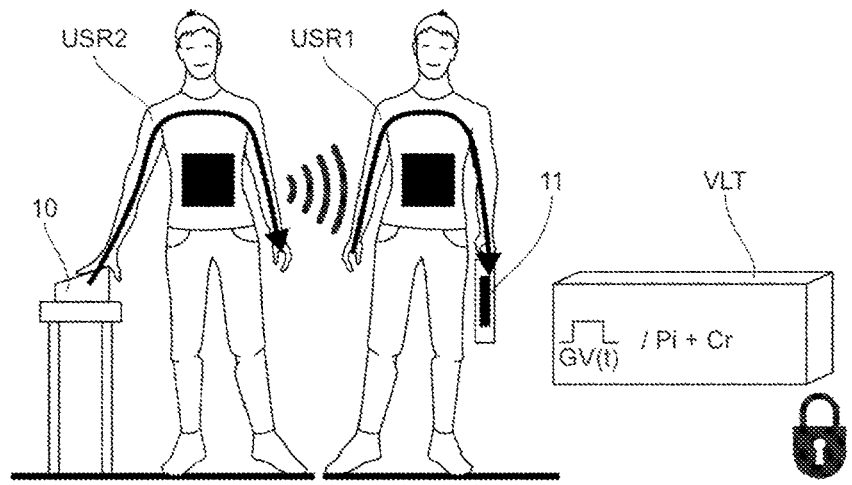
FIG. 1A shows setup of the delegation of a biometric signature of a user USR2 to a user USR1 according to one particular embodiment of the invention.

The invention allows a user (USR2 in FIG. 1A) to delegate a biometric signature, or biometric rights, to a third party (USR1 in FIG. 1A). For this, the invention is based on an IBC-type technology according to which the user's Voluntary Gesture (USR2) is the biometric reference or signature.

Such biometric signature delegation may for example be carried out temporarily, for example a parent who wishes to allow his child to pay a few bills or to treat themselves to a good on the Internet, or even to withdraw a sum of money from a dispenser.

FIG. 1A shows the setup of the delegation of the biometric signature of the user USR2 to the user USR1. When setting up such a delegation, the user USR2 chooses at least one validity criterion Cr for the delegation. For example, such a criterion may be a number of times the user USR1 will be allowed to use the biometric signature of the user USR2 to authenticate himself to a service, for example to perform a banking or payment transaction. This number is chosen by the user USR2 for example on an interface of an NFC transmitter device 10.

The validity criterion Cr may also be a transaction amount not to be exceeded.

The validity criterion Cr may also be an identifier or code to be transmitted to the payment service in addition to the biometric signature of the user USR2. This code can be defined by the user USR2 when setting up the delegation. For example, when the user USR2 sets up the delegation, he uses a dedicated application on his terminal or on the transmitter device 10 via which he registers the setup of the delegation by supplying information such as the identifier of the user USR1, the code to be confirmed when the user USR1 wants to authenticate himself to a service using the biometric signature of the user USR2. This information is transmitted and stored on a server managing the biometric signature delegation, in association with the reference biometric signature or reference signal of the user USR2.

The user USR2 then needs to transmit his biometric signature to the user USR1 in a secure manner.

To do this, the user USR2 will firstly touch the NFC transmitter device 10, which transmits an NFC signal in the IBC format, and will secondly ask the user USR1 to move close to him. The user USR2 then performs his voluntary gesture GV by brushing or touching the surface of the transmitter device 10.

A voluntary gesture GV of this kind corresponds for example to a determined movement of the hand or finger of the user USR2 over the surface that the user USR2 performs when he wishes to authenticate himself to a service. In other variants, a voluntary gesture of this kind may simply consist of moving his hand toward the transmitter device 10.

When the user USR2 brushes or touches the surface of the transmitter device 10, the NFC signal transmitted by the transmitter device 10 is modified and conducted by the body of the user USR2, then by the body of the user USR1 situated close to the latter, to the terminal 11 of the user USR1. A modified and transmitted signal GV(t) of this kind corresponds to the signal also called Voluntary Gesture of the user USR2 bearing the characteristics of the user USR2.

The terminal 11 of the user USR1 is equipped with a dedicated application making it possible to retrieve and store the biometric signature of the user USR2 from the received signal GV(t). When the user USR2 has defined one or more validity criteria to be confirmed when his biometric signature is used, this or these validity criterion/criteria Cr initialized by the user USR2 are encoded in a frame of the NFC signal GV(t) and retrieved by the terminal 11.

According to the variants, the terminal 11 can store the received signal GV(t) directly or can extract a group of characteristic data Pi from this signal. As a variant, the group of characteristic data Pi can be encoded in a frame of the NFC signal GV(t).

In order to secure the use of the biometric signature of the user USR2, the biometric signature (GV(t) or Pi) and the validity criterion/criteria Cr are stored in a secure memory VLT of the terminal 11, also called a safe or vault. For example, the biometric signature and the validity criteria are stored in encrypted form.

Figure 1B:
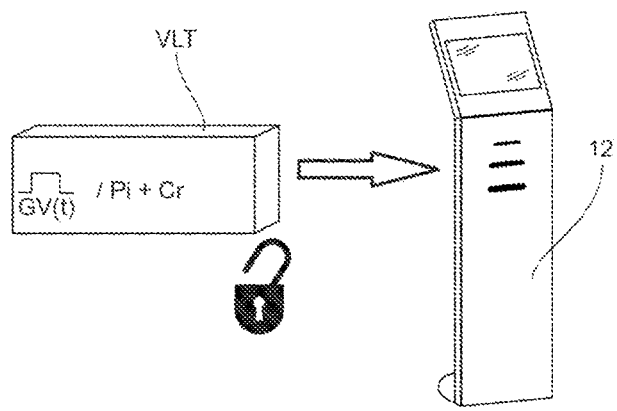
FIG. 1B shows authentication of the user USR1 to an authentication device on the basis of the biometric signature of the user USR2, according to one particular embodiment of the invention.

FIG. 1B shows the authentication of the user USR1 to an authentication device 12 on the basis of the biometric signature of the user USR2. For example, said authentication device may be a server, a payment terminal, an access point, etc.

To do this, the user USR1 uses a dedicated application on his terminal 11 that accesses the secure space VLT of the terminal 11. To access the data stored in the secure space VLT of the terminal 11, the user USR1 for example enters a secret code allowing access to the secure space to be unlocked. The terminal 11 then transmits to the authentication device 12 the biometric signature (GV(t) or Pi), and possibly the validity criterion/criteria Cr when they are present, and an identifier of the user USR2 if he has not already supplied it to the authentication device 12. Such a transmission can be carried out using a wireless communication, for example Bluetooth, WiFi, 4G or other. To validate the authentication of the user USR1, the authentication device 12 confirms the validity criterion/criteria and whether the transmitted biometric signature does correspond to the reference biometric signature of the user USR2.

Figure 2:
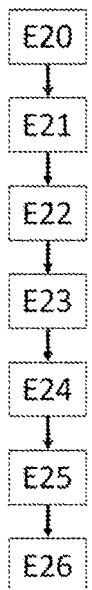
FIG. 2 shows steps of the method for supplying a biometric signature and steps of the method for obtaining the biometric signature according to one particular embodiment of the invention.

FIG. 2 shows steps of the method for supplying a biometric signature and steps of the method for obtaining the biometric signature according to one particular embodiment of the invention. The supply method is for example implemented by the transmitter device 10 of FIG. 1A, and the obtaining method is for example implemented by the terminal 11 of the user USR1.

In a step E20, at least one validity criterion is initialized by the user USR2 on the transmitter device 10. Such a criterion corresponds for example to a maximum number of uses of the biometric signature by the user USR1, or to a maximum amount authorized during a payment transaction performed by the user USR1 using the biometric signature of the user USR2, or even to a maximum cumulative amount authorized during successive payment transactions performed by the user USR1 using the biometric signature of the user USR2. According to other variants, the validity criterion may be a code with multiple digits or letters that is defined by the user USR2. As a variant, the validity criterion may be a combination of the aforementioned criteria. This initialized validity criterion is associated with the biometric signature of the user USR2 by the transmitter device 10. It can be transmitted by the transmitter device 10 to a server storing the reference biometric signature of the user USR2 and associated with an identifier of the user USR1 for example, for more security when the biometric signature is used.

According to one particular embodiment of the invention, in a step E21, the validity criterion is encoded by the transmitter device 10 in a field of a frame of a radio signal $S_2$. This radio signal $S_2$ is generated by the transmitter device 10 using a near-field communication (NFC) technology.

According to one variant embodiment of the invention, the biometric signature of the user USR2 is also encoded in a frame of the generated radio signal $S_2$. According to this variant, the biometric signature is represented by a group Pi of characteristic data of the user USR2 that is obtained from an NFC radio signal $S_1$ transmitted by the transmitter device 10 to a terminal of the user USR2 by using the electromagnetic wave conduction capabilities of the body of the user USR2. The signal $S_1$ corresponds to the signal representing the voluntary gesture of the user USR2.

Figure 3:
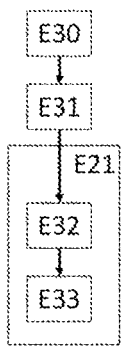
FIG. 3 shows steps of the method for supplying a biometric signature according to another particular embodiment of the invention.

To obtain such a group Pi of characteristic data of the user USR2, the group Pi of characteristic data of the user USR2 was obtained by the transmitter device 10 in a phase prior to the setup of the delegation of the biometric signature of the user USR2. This preliminary phase is described in more detail with reference to FIG. 3.

In a step E30, the transmitter device 10 transmits an NFC signal $S_1$. The NFC signal $S_1$ is transmitted using the IBC format. Such a signal $S_1$ is modified when the user USR2 comes into contact with or touches a surface of the transmitter device 10. This modified signal $S_1$ is conducted by the body of the user USR2 to a terminal of the user USR2, which receives it.

In a step E31, the terminal of the user USR2 analyzes the received signal $S_1$ and extracts the group Pi of characteristic data of the user USR2. This group of data Pi is then stored in a memory of the terminal of the user USR2 and possibly transmitted to the transmitter device 10, via a return communication channel, for example using Bluetooth or WiFi. The analysis of the received signal $S_1$ is for example described in the patent application WO2016001506A1.

When the delegation of the biometric signature of the user USR2 is set up, while the radio signal $S_2$ is being generated by the transmitter device 10 (step E21 of FIG. 2), the transmitter device 10 obtains the group of characteristic data Pi of the user USR2 in a step E32. This group of data Pi can either be obtained from a memory of the transmitter device 10 or received from the terminal of the user USR2, for example using Bluetooth or WiFi.

In a step E33, the group of characteristic data Pi of the user USR2 is encoded in a frame of the radio signal $S_2$ generated by the transmitter device 10.

According to another variant embodiment of the invention, the group of characteristic data Pi of the user USR2 is not available from the transmitter device 10 and is therefore not encoded in a frame of the signal $S_2$. According to this variant, the signal representing the voluntary gesture of the user USR2 will be obtained by the terminal of the user USR1 from the shape and power of the signal $S_2$.

Returning to FIG. 2, in a step E22, the transmitter device 10 transmits the generated radio signal $S_2$ to the terminal 11 of the user USR1, using the IBC format. This signal $S_2$ is conducted via a channel using the electromagnetic wave conduction capabilities of the body of the user USR2 when the user USR2 comes into contact with or touches a surface of the transmitter device 10 and via a channel using the electromagnetic wave conduction capabilities of the body of the user USR1 when the user USR1 comes into contact with, touches or is close to the user USR2.

In a step E23, the terminal 11 of the user USR1 receives the radio signal $S_2$ transmitted by the transmitter device 10 using a near-field communication NFC technology. The received signal $S_2$ is a signal modified by the conduction through the body of the user USR2 and the conduction through the body of the user USR1.

According to one particular embodiment of the invention, in a step E24, the terminal 11 decodes the validity criterion/criteria encoded in a frame of the received radio signal $S_2$.

In a step E25, the terminal 11 obtains the biometric signature of the user USR2 from the received radio signal $S_2$.

For this, according to one variant embodiment, according to which the biometric signature is encoded in a frame of the received radio signal $S_2$, the characteristic data Pi of the user USR2 are decoded from the radio signal $S_2$.

Figure 4:
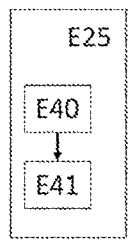
FIG. 4 shows steps of the method for obtaining a biometric signature according to another particular embodiment of the invention.

According to another variant embodiment of the invention, the biometric signature of the user USR2 is obtained from the analysis of the shape and power of the signal $S_2$. Step E25 is described in more detail according to this variant with reference to FIG. 4.

In a step E40, a characteristic signal GV(t) of the user USR2 is extracted from the received radio signal $S_2$ and a characteristic signal GV1(t) of the user USR1 previously stored by the terminal 11. Indeed, the signal $S_2$ is derived from a convolution of the signal transmitted by the transmitter device 10 by the transfer function representing the conduction by the body of the user USR1 and by the transfer function representing the conduction by the body of the user USR2. The characteristic signal GV(t) of the user USR2 is therefore obtained by de-convoluting (or inverse convolution of) the signal $S_2$ by way of the characteristic signal GV1(t) of the user USR1. When the biometric signature of the user USR2 is represented by the characteristic signal GV(t), this signal is stored in the terminal 11 of the user USR1 as it is.

As a variant, when the biometric signature of the user USR2 is represented by the group of data Pi, in a step E41, the group of characteristic data Pi of the user USR2 is obtained from the extracted characteristic signal GV(t).

Returning to FIG. 2, in a step E26, the biometric signature (GV(t) or Pi) of the user USR2 is stored by the terminal 11 in a secure memory space of the terminal 11, with the decoded validity criterion/criteria when they are present.

To secure this delegation further, the user USR1 is asked to initialize a secret code making it possible to lock access to the biometric signature of the user USR2 that is stored on his terminal 11. The biometric signature will thus be accessible on the terminal 11 only after the user of the terminal 11 has entered the secret code.

The biometric signature delegation from the user USR2 to the user USR1 is thus set up.

Figure 5:
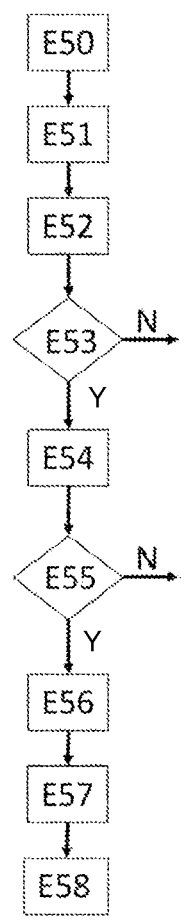
FIG. 5 shows steps of the authentication method according to one particular embodiment of the invention.

FIG. 5 shows steps of the authentication method according to one particular embodiment of the invention, wherein the user USR1 uses the biometric signature of the user USR2 to authenticate himself. The authentication method is for example implemented by the authentication device 12 of FIG. 1B.

In a step E50, the user USR1 asks to be authenticated to the authentication device 12. For example, it may be necessary to validate a payment transaction in the name of or on behalf of the user USR2. This authentication request is for example implemented via a dedicated payment application installed on the terminal 11 and configured to communicate with the authentication device 12, for example a payment terminal.

To request authentication using the biometric signature of the user USR2, the user USR1 needs to unlock access to the biometric signature stored on his terminal 11. The application for example asks the user USR2 to enter his secret code to unlock access to the biometric signature and allow it to be transmitted to the authentication device 12. If the user USR2 fails when entering the secret code, possibly after several attempts, the authentication method fails.

In a step E51, the terminal 11 of the user USR1 transmits the data representing the biometric signature of the user USR2 to the authentication device 12. These data comprise in particular:
- an identifier of the user USR2,
- the biometric signature of the user USR2 in the form of a characteristic signal GV(t) or a group of data Pi, and
- the validity criterion/criteria associated with the biometric signature when they are present, and
- possibly an identifier of the first user.

Following receipt by the authentication device 12 of the data transmitted by the terminal 11 of the user USR1, in a step E52, the authentication device 12 obtains the validity criterion/criteria. In particular, when a code-type criterion is received, the authentication device 12 obtains from a server the code initialized by the user USR2 when setting up the delegation of the biometric signature.

In a step E53, the authentication device 12 confirms that the validity criterion/criteria is (are) satisfied. For example, when the validity criterion corresponds to a maximum number of uses of the biometric signature, it is confirmed whether the maximum number of uses is strictly greater than 0. When the validity criterion corresponds to a maximum authorized amount, it is confirmed whether the maximum authorized amount is greater than or equal to the amount of the payment transaction to be validated.

When the validity criterion corresponds to a maximum authorized cumulative amount, it is confirmed whether the maximum authorized cumulative amount is greater than or equal to the amount of the payment transaction to be validated. When the validity criterion corresponds to a code, it is confirmed that the received code is identical to the code initialized by the user USR2 when setting up the delegation of the biometric signature.

When at least one of the validity criteria is not confirmed, the authentication method fails.

When all the validity criteria are satisfied, when the biometric signature of the user USR2 is in the form of the characteristic signal GV(t), in a step E54, the authentication device 12 calculates the group of data Pi on the basis of the characteristic signal GV(t). In a step E55, the authentication device 12 compares the group of obtained data Pi with reference characteristic data $Pi^{ref}$ of the user USR2. These reference data $Pi^{ref}$ are obtained by the authentication device 12 on the basis of the identifier of the user USR2, either from a memory of the authentication device 12 or by receiving them from a server (not shown).

Following step E55, if the group of obtained data Pi does not correspond to the reference characteristic data $Pi^{ref}$ of the user USR2, the authentication method fails. Otherwise, when the group of obtained data Pi corresponds to the reference characteristic data $Pi^{ref}$ of the user USR2, the authentication device 12 validates the authentication of the user USR1 via the biometric signature of the user USR2.

According to one particular embodiment of the invention, in a step E57, the validity criterion is updated. When the validity criterion corresponds to a maximum number of uses of the biometric signature, the value of the validity criterion is reduced by 1. When the validity criterion corresponds to a maximum authorized amount, the value of the validity criterion is set to 0. Here, the user USR1 is regarded as being authorized to use the biometric signature of the user USR2 only once.

When the validity criterion corresponds to a maximum authorized cumulative amount, the value of the validity criterion is reduced by the amount of the transaction to be validated.

In a step E58, the authentication device 12 sends the terminal 11 of the user USR1 the updated validity criterion, which is then stored by the terminal 11 in the secure memory space.

Figure 6:
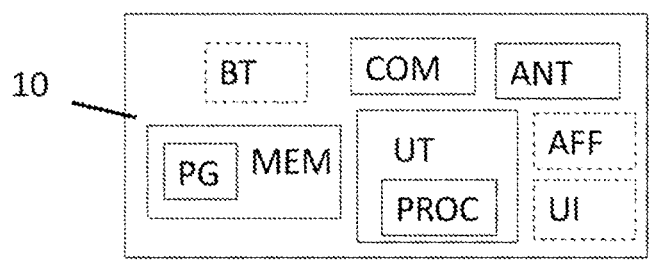
FIG. 6 shows the simplified structure of a transmitter device configured to implement steps of the method for supplying a biometric signature according to one particular embodiment of the invention.

FIG. 6 shows the simplified structure of a transmitter device configured to implement steps of the method for supplying a biometric signature according to one particular embodiment of the invention.

According to this particular embodiment of the invention, the transmitter device 10 has the conventional architecture of a computer, and in particular comprises a memory MEM, a processing unit UT, equipped for example with a processor PROC, and controlled by the computer program PG stored in memory MEM. The computer program PG comprises instructions for implementing the steps of the method for supplying a biometric signature as described previously when the program is executed by the processor PROC.

On initialization, the code instructions of the computer program PG are for example loaded into a memory before being executed by the processor PROC. The processor PROC of the processing unit UT in particular implements the steps of the method for supplying a biometric signature according to any one of the particular embodiments described with reference to FIGS. 1A, 2 and 3, according to the instructions of the computer program PG.

The transmitter device 10 also comprises a near-field communication module ANT comprising in particular an antenna suited to transmitting signals over the radio channel and possibly through the human body and a modulator intended to adapt a digital signal produced by the processor to obtain a modulated electrical signal, which is intended to be transmitted, via the antenna. The modulation operation performed by the modulator is for example an amplitude modulation: the signal is a 13.56 MHz signal, amplitude-modulated with a modulation rate of approximately 10% (known characteristic of type B according to the NFC standard). The invention is not limited to this type of modulation, however. In another exemplary embodiment, the modulation is a frequency modulation, which is less sensitive to interference, or a phase modulation.

According to one particular embodiment of the invention, the transmitter device 10 is provided with a contact surface, not shown, suited to reacting to the close proximity of the user (contact, quasi-contact, touch, etc.). In the example described here, this surface corresponds to the antenna, so that a modulated electrical signal transmitted via the antenna is capable of being conveyed by the body of the user who is close to the surface. In one exemplary embodiment, the antenna may be integrated in the surface. The surface is designed to interact with the processing unit UT to implement the steps of the method for supplying a biometric signature.

According to one particular embodiment of the invention, the transmitter device 10 comprises a Bluetooth- or WiFi-type radio module BT intended in particular to interchange data with the terminal 11 of the user USR1 and a terminal of the user USR2.

According to one particular embodiment of the invention, the transmitter device 10 comprises a communication interface COM allowing the transmitter device 10 to establish communications via a fixed or mobile data network.

According to one particular embodiment of the invention, the transmitter device 10 comprises a display module AFF, for example a screen and a user interaction module UI, for example a numeric keypad.

According to one particular embodiment of the invention, the transmitter device 10 is included in a terminal.

Figure 7:
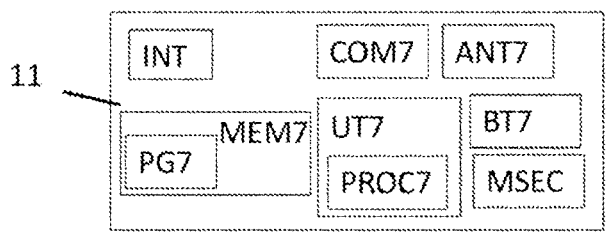
FIG. 7 shows the simplified structure of a terminal configured to implement steps of the method for obtaining a biometric signature according to one particular embodiment of the invention.

FIG. 7 shows the simplified structure of a terminal 11 configured to implement steps of the method for obtaining a biometric signature according to one particular embodiment of the invention.

According to this particular embodiment of the invention, the terminal 11 has the conventional architecture of a computer and comprises in particular a memory MEM7, a processing unit UT7, equipped for example with a processor PROC7, and controlled by the computer program PG7 stored in memory MEM7. The computer program PG7 comprises instructions for implementing the steps of the method for obtaining a biometric signature as described previously when the program is executed by the processor PROC7.

On initialization, the code instructions of the computer program PG7 are for example loaded into a memory before being executed by the processor PROC7. The processor PROC7 of the processing unit UT7 in particular implements the steps of the method for obtaining a biometric signature according to any one of the particular embodiments described with reference to FIGS. 1A-2 and 4 and of the authentication method described with reference to FIGS. 1B and 5, according to the instructions of the computer program PG7.

According to one particular embodiment of the invention, the terminal 11 also includes a near-field communication module ANTI comprising in particular a CBB antenna suited to receiving signals over the radio channel and possibly through the human body, so that an electrical signal modulated and possibly transported by the body of the user is able to be received by the antenna, which is located in the terminal, close to the human body, a demodulator intended to receive a modulated electrical signal via the antenna and to transform said signal into a digital signal intended to be transmitted to the processing unit UT7, and the software components (firmware, etc.) required for implementing CBB/IBC communications.

The terminal 11 also comprises a secure memory VLT configured to securely store on the terminal 11 the biometric signature of the user USR2 and the associated data (validity criterion in particular). For example, such a memory VLT is secured by cryptographic means.

According to one particular embodiment of the invention, the terminal 11 comprises a Bluetooth- or WiFi-type radio module BT7 intended in particular to interchange data with an authentication device 12.

According to one particular embodiment of the invention, the terminal 11 comprises a communication interface COM7 allowing the terminal 11 to establish communications via a mobile data network.

According to one particular embodiment of the invention, the terminal 11 comprises a user interaction module INT, for example a touchscreen.

According to one particular embodiment of the invention, the terminal 11 is included in a smartphone.

Figure 8:
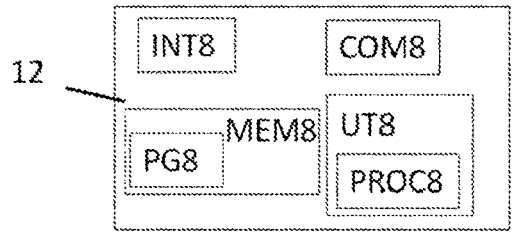
FIG. 8 shows the simplified structure of an authentication device configured to implement steps of the authentication method according to one particular embodiment of the invention.

FIG. 8 shows the simplified structure of an authentication device 12 configured to implement steps of the authentication method according to one particular embodiment of the invention.

According to this particular embodiment of the invention, the authentication device 12 has the conventional architecture of a computer and comprises in particular a memory MEM8, a processing unit UT8, equipped for example with a processor PROC8, and controlled by the computer program PG8 stored in memory MEM8. The computer program PG8 comprises instructions for implementing the steps of the authentication method as described previously when the program is executed by the processor PROC8.

On initialization, the code instructions of the computer program PG8 are for example loaded into a memory before being executed by the processor PROC8. The processor PROC8 of the processing unit UT8 in particular implements the steps of the authentication method according to any one of the particular embodiments described with reference to FIGS. 1B and 5, according to the instructions of the computer program PG8.

According to one particular embodiment of the invention, the authentication device 12 is included in a payment terminal.

The invention claimed is:

1. A supply method for supplying a terminal of a first user with a biometric signature of a second user, the supply method being implemented by a transmitter device and comprising:
generating a radio signal using a near-field communication technology; and
transmitting said generated radio signal to the terminal of the first user, the radio signal being conducted via a channel using electromagnetic wave conduction capabilities of a body of the second user when the second user comes into contact with or touches a surface of the transmitter device and via a channel using electromagnetic wave conduction capabilities of a body of the first user when the first user comes into contact with or touches the second user, the signal conducted via the body of the first user and via the body of the second user comprising a signal representing the biometric signature of the second user.

2. The supply method as claimed in claim 1, further comprising initializing at least one validity criterion associated with the biometric signature of the second user, the validity criterion being encoded in a frame of the transmitted radio signal.

3. The supply method as claimed in claim 1, wherein generating the radio signal comprises:
obtaining a group of characteristic data of the second user from a radio signal transmitted by the transmitter device and received by a terminal of the second user via a channel using the electromagnetic wave conduction capabilities of the body of the second user when the second user comes into contact with or touches a surface of the transmitter device; and
encoding the group of characteristic data of the second user in the radio signal to the terminal of the first user.

4. An obtaining method for obtaining a biometric signature of a second user by way of a terminal of a first user, the obtaining method being implemented by the terminal of the first user and comprising:
receiving a radio signal transmitted by a transmitter device using a near-field communication technology, via a channel using electromagnetic wave conduction capabilities of a body of the second user when the second user comes into contact with or touches a surface of the transmitter device and via a channel using the electromagnetic wave conduction capabilities of the body of the first user when the first user comes into contact with or touches the second user;
obtaining the biometric signature of the second user from the received radio signal; and
storing the obtained biometric signature of the second user in a secure memory space of the terminal of the first user.

5. The obtaining method as claimed in claim 4, further comprising decoding from the received radio signal, and storing, a validity criterion associated with the biometric signature of the second user.

6. The obtaining method as claimed in claim 4, wherein obtaining the biometric signature of the second user comprises decoding a group of characteristic data of the second user.

7. The obtaining method as claimed in claim 4, wherein obtaining the biometric signature of the second user comprises extracting a characteristic signal of the second user from the received radio signal and from a characteristic signal of the first user previously stored by the terminal.

8. The obtaining method as claimed in claim 7, wherein obtaining the biometric signature of the second user comprises obtaining a group of characteristic data of the second user from the extracted characteristic signal of the second user.

9. An authentication method for authenticating a first user with a biometric signature of a second user, said method being implemented by an authentication device and comprising:
receiving, from a terminal of the first user, data representing the biometric signature of the second user, from a radio signal transmitted by a transmitter device using a near-field communication technology, via a channel using electromagnetic wave conduction capabilities of a body of the second user when the second user comes into contact with or touches a surface of a transmitter device, and via a channel using electromagnetic wave conduction capabilities of a body of the first user when the first user comes into contact with or touches the second user;
obtaining characteristic data of the second user from the data representing the biometric signature of the second user;
comparing the obtained characteristic data of the second user with reference characteristic data of the second user; and
in response to the obtained characteristic data of the second user corresponding to the reference characteristic data of the second user, validating the authentication of the first user.

10. The authentication method as claimed in claim 9, further comprising:
obtaining from the received data at least one validity criterion associated with the biometric signature;
confirming that the validity criterion is satisfied; and
validation of the authentication of the first user being implemented only when the validity criterion is satisfied.

11. The authentication method as claimed in claim 10, further comprising:
updating said at least one validity criterion; and
sending said at least one updated validity criterion to the terminal of the first user.

12. A transmitter device configured to supply a terminal of a first user with a biometric signature of a second user, the transmitter device comprising:
a processor and a memory that are configured to:
generate a radio signal using a near-field communication technology; and
transmit said generated radio signal to the terminal of the first user, via a channel using electromagnetic wave conduction capabilities of a body of the second user when the second user comes into contact with or touches a surface of the transmitter device and via a channel using electromagnetic wave conduction capabilities of a body of the first user when the first user comes into contact with or touches the second user.

13. A terminal of a first user configured to obtain a biometric signature of a second user, the terminal of the first user comprising:
a processor and a memory that are configured to:
receive a radio signal transmitted by a transmitter device using a near-field communication technology, via a channel using electromagnetic wave conduction capabilities of a body of the second user when the second user comes into contact with or touches a surface of the transmitter device and via a channel using electromagnetic wave conduction capabilities of a body of the first user when the first user comes into contact with or touches the second user;
obtain the biometric signature of the second user from the received radio signal; and
store the obtained biometric signature of the second user in a secure memory space of the terminal of the first user.

14. An authentication device for authenticating a first user with a biometric signature of a second user, the authentication device comprising:
a processor and a memory that are configured to:
receive, from a terminal of the first user, data representing the biometric signature of the second user;
obtain characteristic data of the second user from the data representing the biometric signature of the second user;
compare the obtained characteristic data of the second user with reference characteristic data of the second user; and
in response to the obtained characteristic data of the second user corresponding to the reference characteristic data of the second user, validate the authentication of the first user.

15. A non-transitory computer readable medium comprising instructions stored thereon for implementing a supply method for supplying a terminal of a first user with a biometric signature of a second user, when the program is executed by a processor of a transmitter, wherein the supply method comprises:
generating a radio signal using a near-field communication technology; and
transmitting said generated radio signal to the terminal of the first user, the radio signal being conducted via a channel using electromagnetic wave conduction capabilities of a body of the second user when the second user comes into contact with or touches a surface of the transmitter device and via a channel using electromagnetic wave conduction capabilities of a body of the first user when the first user comes into contact with or touches the second user, the signal conducted via the body of the first user and via the body of the second user comprising a signal representing the biometric signature of the second user.

* * * * *